Figure 1:
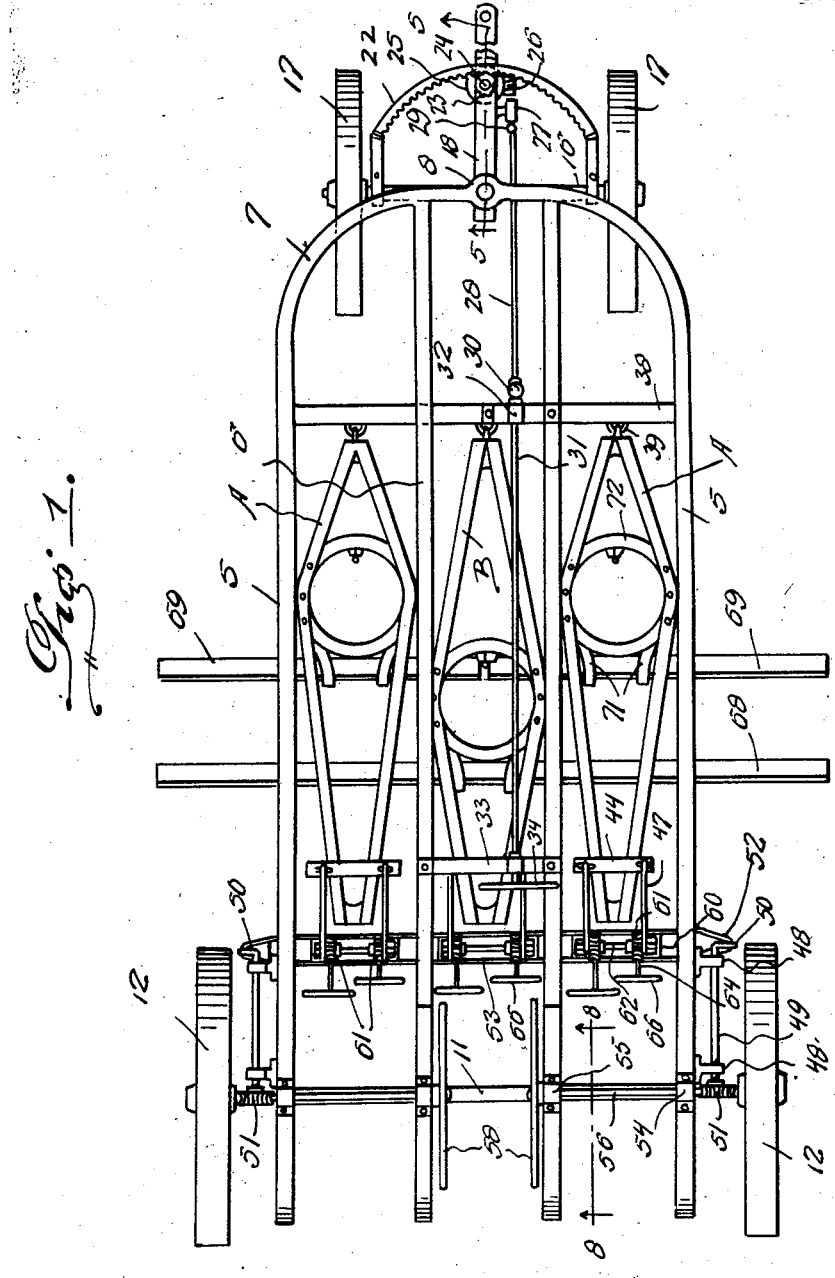

Jan. 3, 1928.

W. A. COAD 1,654,636

ROAD SCRAPING APPARATUS

Filed March 12, 1927   5 Sheets-Sheet 1

Inventor
William A. Coad,

By Clarence A. O'Brien
Attorney

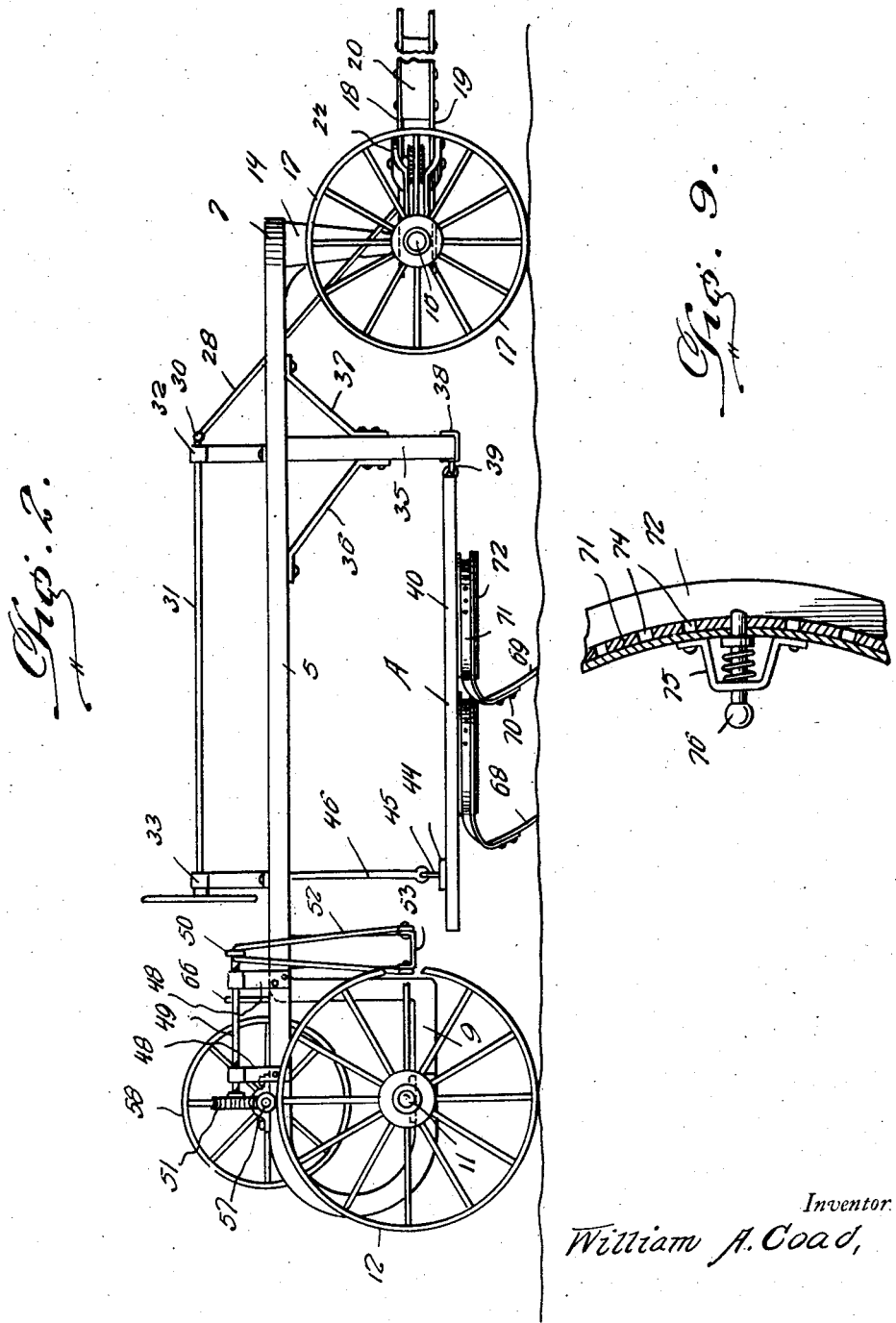

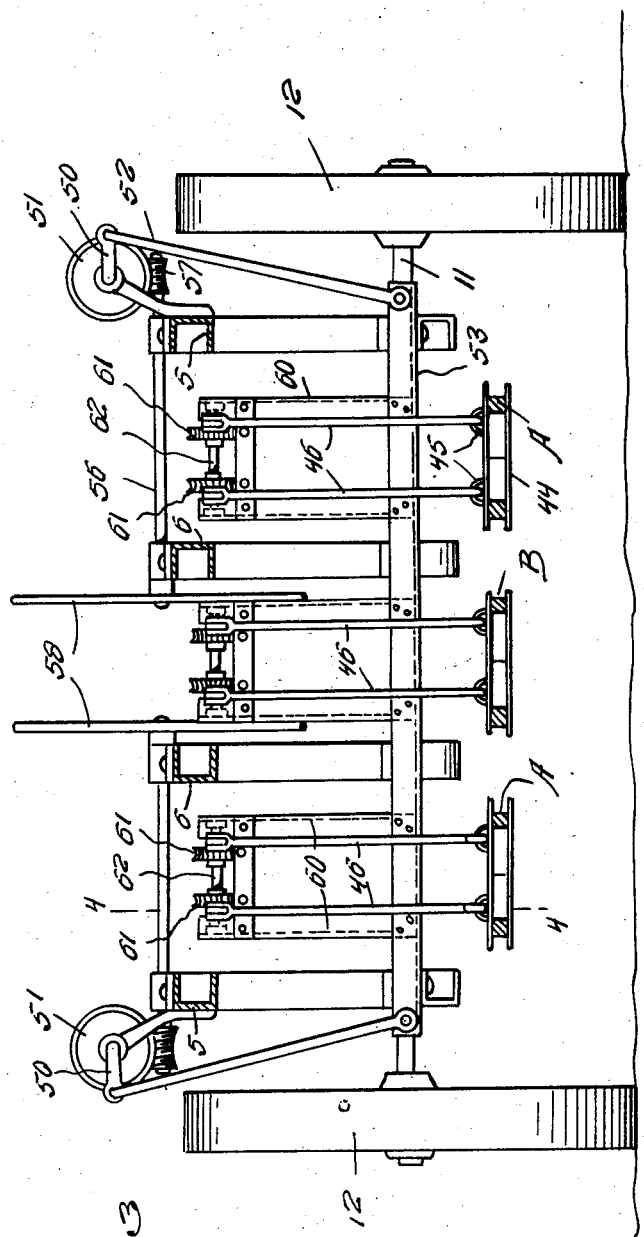

Jan. 3, 1928.
W. A. COAD
1,654,636
ROAD SCRAPING APPARATUS
Filed March 12, 1927
5 Sheets-Sheet 4
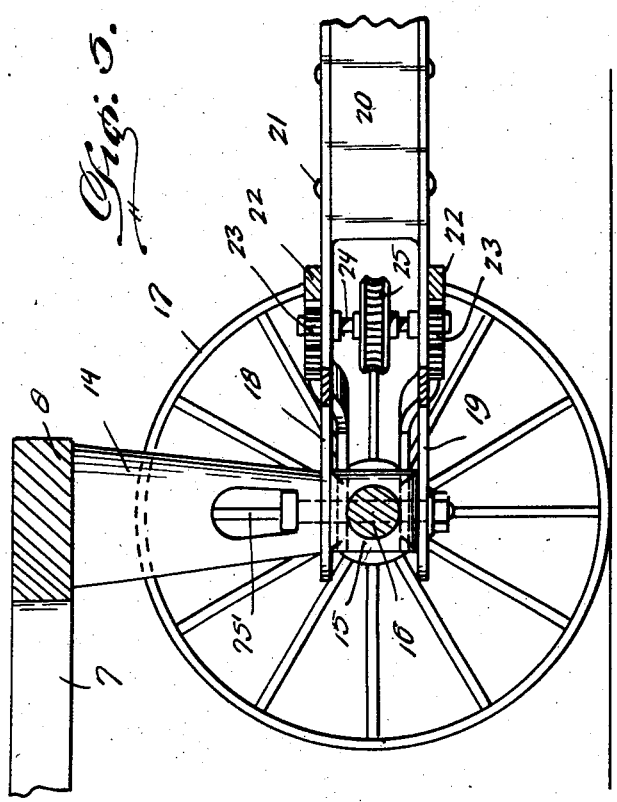
Inventor
William A. Coad,
By Clarence A. O'Brien
Attorney

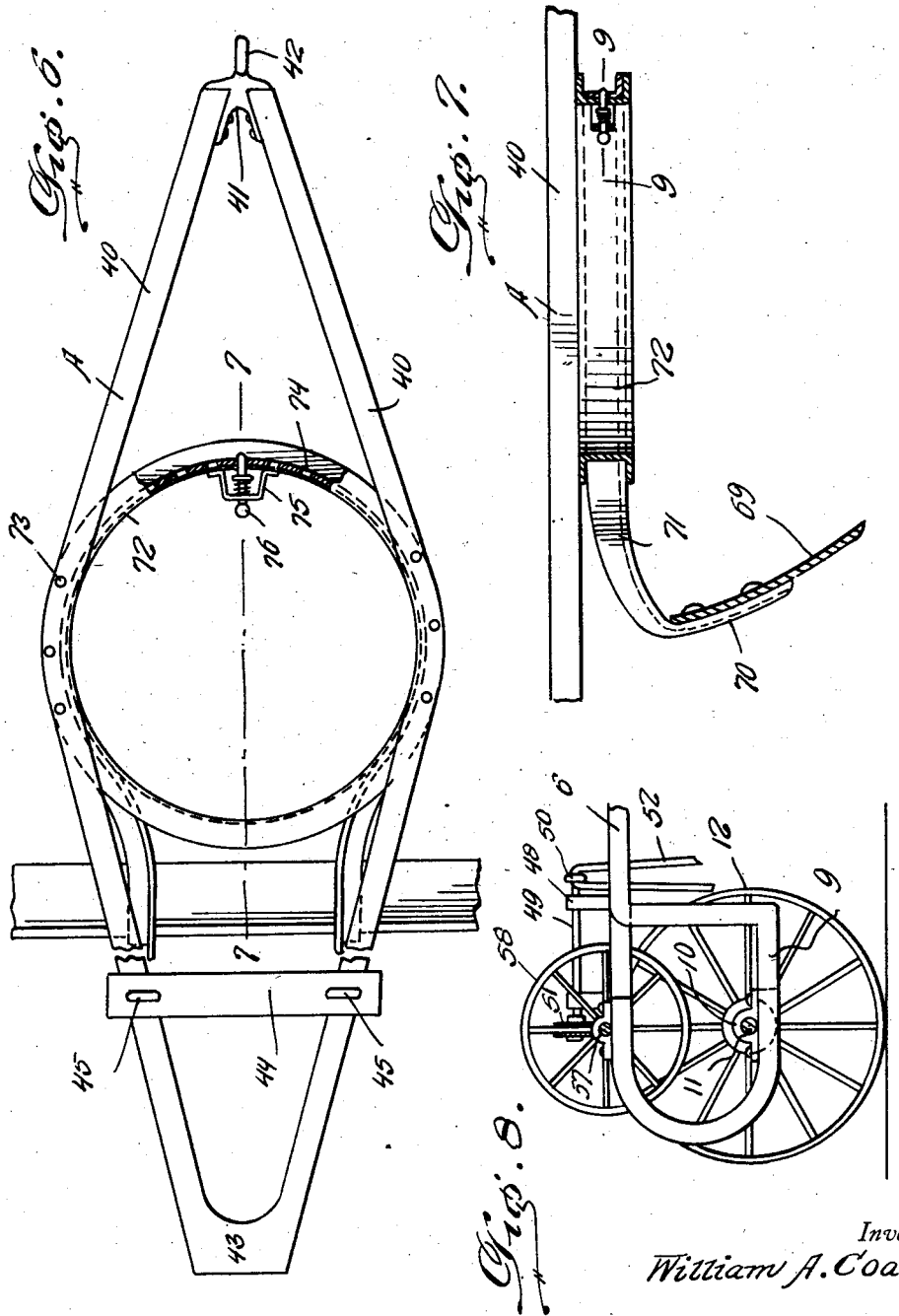

Patented Jan. 3, 1928.

1,654,636

UNITED STATES PATENT OFFICE.

WILLIAM A. COAD, OF MARSHALL, MISSOURI.

ROAD-SCRAPING APPARATUS.

Application filed March 12, 1927. Serial No. 174,818.

The present invention relates to a road scraping apparatus and has for its prime object to provide a plurality of scraping blades mounted from a wheeled frame so that the blades may be adjusted towards and away from the road and may be further adjusted to be disposed at an angle to the line of travel.

A still further object of the invention lies in the provision of an apparatus of this nature which provides a plurality of independent adjustment features whereby the maximum efficiency may be attained in the maintenance of the roadway.

A still further very important object of the invention lies in the provision of an apparatus of this nature having a compact and convenient construction and arrangement of parts which are thoroughly reliable in use and operation, strong and durable, and otherwise well adapted to the purpose for which they are designed.

With the above and numerous other objects in view as will appear as the description proceeds, the invention resides in certain details of construction, and in the combination and arrangement of parts as will be hereinafter more fully described and claimed.

In the drawing:—

Figure 1 is a top plan view of the apparatus embodying the features of my invention, Fig. 2 is a side elevation thereof, Fig. 3 is a vertical transverse section looking rearwardly, Fig. 4 is an enlarged detail section taken on the line 4—4 of Fig. 3, Fig. 5 is an enlarged detail section taken vertically through the forward portion of the apparatus substantially on the line 5—5 of Fig. 1, Fig. 6 is an enlarged detail plan view of one of the blade supporting frames, Fig. 7 is a sectional view taken substantially on the line 7—7 of Fig. 6, Fig. 8 is a vertical detail section taken substantially on the line 8—8 of Fig. 1, Fig. 9 is an enlarged detail section taken on line 9—9 of Fig. 7, Fig. 10 is a perspective view of one of the spring pressed bolts.

Referring to the drawing in detail it will be seen that the chassis of the apparatus includes a pair of outside longitudinally extending bars 5 and a pair of longitudinally extending bars 6 disposed between the bars 5 in spaced parallel relation to each other and to said bars 5. The forward ends of the bars 5 merge into curved portions 7 which merge into each other at a bearing 8. The rear ends of the bars 5 and 6 are curved downwardly, then forwardly, then upwardly as is clearly illustrated in Figs. 2 and 8. The bottom horizontal portions 9 thus formed at the rear ends of bars 5 and 6 have mounted thereon bearings 10 with an axle 11 therein on the ends of which are mounted the rear wheels 12. A tubular member 14 depends from the front of the chassis and has a block 15 at its lower end through which extends front axle 16 having front wheels 17 mounted on its end. Bars 18 and 19 project forwardly from the block 15 one above and one below and receive between their forward ends a tongue 20 fixed thereto by fasteners 21 or in any other suitable manner. A pair of arcuate rack bars 22 have their ends fixed to the axle 16 adjacent the wheels 17 and extend over the bar 18. Gears 23 mesh with the teeth of the rack bars 22 and are fixed on a shaft 24 journaled in the bars 18 and 19. Between the bars 18 and 19 on the shaft 24 there is disposed a worm gear 25 with which meshes a worm 26 the shaft of which is journaled in bearing brackets 27 and is connected with a shaft 28 through a universal joint 29. The shaft 28 is connected through a universal joint 30 with steering shaft 31 which is journaled in a bracket 32 carried by the chassis and also in a bracket 33 carried by the shaft adjacent its rear end, and a steering wheel 34 is on the rear end of the shaft 31   Obviously by turning the wheel 34 the worm 26 may be turned in either direction for actuating the worm gear 25 and gear 23 to move the rack bar 22 for changing the angle of the axle 16 so as to steer the chassis independently of the draft means.

Standards 35 depend from the forward portions of the sidebars 5 rearwardly of the curved portions 7 thereof and are securely braced by members 36 and 37 in respect to said side bars as is clearly illustrated in Fig. 2. These standards 35 or hangers support a transverse beam 38 which has, in the present instance, three rearwardly extending eyelets 39. Three main frames A, A and B are constructed of a somewhat diamond shape. Each of these main frames includes a pair of V-shaped side beams 40 the forward ends of which are fixed to a bracket 41 having an eyelet 42 and the rear ends of which are merged together as is indicated at 43. The eyelets 42 are engaged with eyelets 39. Cross bars 44 are fixed to the rear portions of the frames A, A and B and have eyelets 45 rising from the end portions thereof. Links 46 are connected with the eyelets as is clearly shown in Figure 4, and are pivotally engaged with the ends of cranks 47. Bearing brackets 48 rise from the rear portions of the bars 5 to the outer side thereof, there being two of these brackets on each bar disposed in spaced relation. Shafts 49 are journaled in the brackets 48 and have outwardly projecting cranks 50 at their forward ends and worm gears 51 at their rear ends. Links 52 depend from the cranks 50 and support a beam 53 transversely below the chassis. Bearings 54 are mounted on the rear portions of bars 5 and similar bearings 55 are mounted on the rear portions of bars 6. Shafts 56 are journaled in these bearings and have worms 57 on their outer ends and hand wheels 58 on their inner ends. It is quite obvious that the beam 52 may be lifted up or let down or tilted to either side by the proper manipulation of the hand wheels 58. A plurality of posts 60 rise from the beam 53 and are arranged in pairs. The cranks 47 are fixed to worm gears 61 rotatable on shafts 62 journaled in the posts 60, one in each pair and two worm gears 61 on each shaft 62. A shaft 64 is journaled in each post 60 and has a worm 65 thereon meshing with the adjacent worm gear 61 and also has a hand wheel 66 thereon. Thus the cranks 47 may be individually swung up or down as may be desired for tilting the frames A, A, and B longitudinally or transversely.

A scraper blade 68 and a pair of scraper blades 69 are disposed below the chassis, the latter forwardly of the former. Scraper blades 69 are mounted on frames A—A while scraper blades 69 are mounted on frame B in a manner which will be presently described. The blade 68 is approximately twice as long as these blades 69. A detailed description of the mounting of one of these blades will suffice for all and particular attention is directed to Figures 6 and 7 wherein the mounting of one of the blades 69 is clearly illustrated. This blade 69 is mounted on the offset ends 70 of a substantially U-shaped auxiliary frame 71 the bight portion of which is ring-like or arcuate and is disposed about a channel ring 72 to revolve thereabout. This channel ring 72 is riveted or otherwise securely fixed as at 73 to bars 40 of the frame A. The bight portion of the U-shaped auxiliary frame has a series of apertures 74 therein while a bracket 75 is mounted on the ring 72 and slidably supports a spring pressed bolt 76 which is adapted to project through one of the apertures 74 for the purpose of holding the auxiliary frames in different adjusted positions in respect to the main frame A whereby the angle of the blade may be adapted in respect to the line of travel of the chassis. From the above detailed description, it is thought, that the description, operation, and utility of the invention will be clearly understood without any further detailed description thereof. It will be noted that the blades may be adapted at different angles in respect to the line of travel and in respect to each other and they may be tilted depending upon the crown of the roadway. Any one or any part of the three blades can be raised or lowered independently of the other two and all three may be raised and lowered simultaneously. The two front blades may be set so as to bring dirt or gravel from the outside and inside of the road at the same time depositing the dirt and gravel in front of the center portion of the rear blade which may be disposed to carry the dirt or gravel back to the center of the road or where desired. The front blades can be set in end to end relationship practically making two blades of the same length and may be disposed to move the dirt or gravel in any direction desired. One of the front blades may be disposed so as to move the dirt or gravel out of the side ditch and deposit it directly in front of the large rear blade which will spread the dirt or gravel over the road towards the center. There are numerous other combinations or adjustments which are possible and which will be quite apparent after an operator has become accustomed to the various adjustments and these adjustments may be made to meet almost every contingency with which I am familiar. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An apparatus of the class described including a wheeled chassis, a frame below the chassis, a universal connection between the forward end of the frame and the chassis, a beam, a link rising from each end of the beam, a pair of crank shafts, means for journaling the crank shafts on the rear portion of the chassis, said links being connected with the cranks thereof, and means for rotating the cranks shafts for raising and lowering the beam and also tilting the same transversely of the chassis, posts rising from the beam, a shaft supported by the posts, worm gears on the shaft, means for rotating the worm gears, cranks on the worm gears, links depending from the last mentioned cranks and engaged with the side rear portions of the frame, a scraper blade mounted on the frame.

2. An apparatus of the class described including a wheeled chassis, a frame below the chassis, a universal connection between the forward end of the frame and the chassis, a beam, a link rising from each end of the beam, a pair of crank shafts, means for journaling the crank shafts on the rear portion of the chassis, said links being connected with the cranks thereof and means for rotating the crank shafts for raising and lowering the beam and also tilting the same transversely of the chassis, posts rising from the beam, a shaft supported by the posts, worm gears on the shaft, means for rotating the worm gears, cranks on the worm gears, links depending from the last mentioned cranks and engaged with the side rear portions of the frame; a scraper blade mounted on the frame, means for shifting the scraper blade angularly with respect to the frame.

3. An apparatus of the class described including, in combination, a wheeled chassis, a plurality of frames disposed on the chassis, a universal connections between the forward ends of the frames and the chassis, a beam connecting transversely below the rear portion of the chassis, a pair of shafts, means for journaling the shafts on the chassis, cranks extending outwardly from the shafts, links connecting the cranks with the ends of the beam, means for rotating the shafts for raising and lowering and tilting the beam, posts rising from the beam and arranged in pairs, one pair for each frame, a shaft supported by each pair of posts, a pair of worm gears on each shaft, cranks extending from the worm gears, links depending from the last-mentioned cranks and connected with the side portions of the rear ends of the frames, and worm mechanisms having hand-operated means associated with the worm gears.

4. An apparatus of the class described including, in combination, a wheeled chassis, a plurality of frames disposed in the chassis, universal connections between the forward ends of the frames and the chassis, a beam connecting transversely below the rear portion of the chassis, a pair of crank shafts, means for journaling the shafts, links connecting the cranks of the shafts with the ends of the beam, means for rotating the shafts for raising and lowering and tilting the beam, posts rising from the beam and arranged in pairs, one pair for each frame, a shaft supported by each pair of posts, a pair of worm gears on each shaft, cranks extending from the worm gears, links depending from the last-mentioned cranks and connected with the side portions of the rear ends of the frames, and worm mechanisms having hand-operated means associated with the worm gears, a scraper blade for each frame, and means for mounting the scraper blades on the frames so that they may be shifted to vary the angles thereof to the line of the travel of the chassis.

In testimony whereof I affix my signature.

WILLIAM A. COAD.